(12) United States Patent
Brack et al.

(10) Patent No.: US 7,619,053 B2
(45) Date of Patent: Nov. 17, 2009

(54) MONOMER SOLUTION FOR PRODUCING POLYCARBONATE

(75) Inventors: Hans-Peter Brack, Herrliberg (CH); Maarten Antoon Jan Campman, Churra-Murcia (ES); Martin Herke Oyevaar, Goes (NL); Yohana Perez de Diego, Murcia (ES); Laurus van der Wekke, Rucphen (NL); Dennis James Patrick Maria Willemse, Standdaarbuiten (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 12/055,453

(22) Filed: Mar. 26, 2008

(65) Prior Publication Data

US 2009/0088549 A1 Apr. 2, 2009

Related U.S. Application Data

(63) Continuation-in-part of application No. 11/863,659, filed on Sep. 28, 2007.

(51) Int. Cl.
*C08G 64/00* (2006.01)
*C08G 63/02* (2006.01)

(52) U.S. Cl. .................. 528/196; 422/56; 422/57; 422/62; 422/75; 436/75; 436/79; 436/85; 436/95; 436/106; 436/111; 528/198

(58) Field of Classification Search ................ 422/56, 422/57, 62, 75; 436/75, 79, 85, 95, 106, 436/111; 528/196, 198
See application file for complete search history.

(56) References Cited

U.S. PATENT DOCUMENTS

| | | | |
|---|---|---|---|
| 4,323,668 A | 4/1982 | Brunelle | |
| 4,490,519 A | 12/1984 | Kosanovich et al. | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,678 B1 | 6/2002 | Ishida et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,605,686 B2 * | 8/2003 | Takemoto et al. | ........... 528/196 |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,887,970 B2 | 5/2005 | Kratschmer et al. | |
| 6,900,283 B2 | 5/2005 | Ramesh et al. | |
| 2002/0132957 A1 | 9/2002 | Brack et al. | |
| 2002/0183477 A1 | 12/2002 | Takemoto et al. | |
| 2004/0068086 A1 | 4/2004 | Day et al. | |
| 2004/0087756 A1 | 5/2004 | Ramesh et al. | |
| 2005/0143554 A1 | 6/2005 | Dhara et al. | |
| 2005/0234211 A1 | 10/2005 | Martinez et al. | |
| 2006/0069228 A1 | 3/2006 | McCloskey et al. | |
| 2007/0119041 A1 | 5/2007 | Mascarenas et al. | |
| 2007/0135611 A1 | 6/2007 | Brack et al. | |
| 2008/0004417 A1 | 1/2008 | Jansen et al. | |
| 2008/0004418 A1 | 1/2008 | Jansen et al. | |

FOREIGN PATENT DOCUMENTS

| | | | |
|---|---|---|---|
| JP | 5009282 A2 | | 1/1993 |
| JP | 06-032886 | * | 2/1994 |
| JP | 10101786 A2 | | 4/1998 |
| JP | 10101787 A2 | | 4/1998 |
| JP | 11302228 A2 | | 11/1999 |
| JP | 2000129112 A | | 5/2000 |
| JP | 2002309015 A2 | | 10/2002 |
| WO | 03040208 A1 | | 5/2003 |
| WO | 03106149 A1 | | 12/2003 |

* cited by examiner

*Primary Examiner*—Terressa M Boykin
(74) *Attorney, Agent, or Firm*—Larson & Anderson, LLC

(57) ABSTRACT

A non-reactive monomer mixture has a monomer component dispersed in a melted diaryl carbonate. The monomer component has one or more monomer compounds having a melting point below the melting point of the diaryl carbonate. Furthermore, the monomer component has less than 600 ppb alkali metal, an acid stabilizer, or both less than 600 ppb alkali metal and an acid stabilizer. The monomer compounds of the monomer component and the diaryl carbonate are present in a mole ratio of from 0.9 to 1.1. The monomer mixture is at a temperature between the melting temperature of the lowest melting monomer compound and the melting temperature of the diaryl carbonate.

10 Claims, 10 Drawing Sheets

Influence of Acid Concentration on Inhibiting Conversion in Monomer Solutions

Reactivity of Illustration 2: WE 1

Illustration 2: Reactivity WE1 with Acid addition

Illustration 2: Reactivity WE3

Illustration 2: Reactivity WE3 with acid stabilizer

Illustration 2: Reactivity WE4

MONOMER SOLUTION FOR PRODUCING POLYCARBONATE

CROSS-REFERENCE TO RELATED APPLICATION

The present application is a continuation-in-part of U.S. patent application Ser. No. 11/863,659 filed on Sep. 28, 2007 which is incorporated herein by reference for all purposes.

BACKGROUND

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or by (2) a melt polymerization process in which BPA is transesterified with a diaryl carbonate such as diphenyl carbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain improvements in physical properties relative to those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

Color can be generated in polycarbonates or in copolycarbonates which reduces the transparent quality of resulting articles formed from such. The quality of the starting materials has a large effect on the color of the final polycarbonate. Further, the polymerization and molding conditions used to produce the polycarbonate and molded articles may lead to the formation of side reactions within the polycarbonate leading to color formation therein. It would be beneficial to find a way to improve the color and other properties of polycarbonates.

SUMMARY OF THE INVENTION

The present invention relates to polycarbonate produced by melt transesterification reactions and non-reactive monomer mixtures formed prior to being used in these processes. It has been found that by preparing a non-reactive monomer mixture comprising a diaryl carbonate and a monomer component at a temperature below the melting point of the diaryl carbonate component, one is able to prepare polycarbonates having improved color and less undesired reaction byproducts, particularly those resulting from side reactions of monomers in the oligomerization stage of these processes.

In one embodiment the present invention provides a method of forming a non-reactive monomer mixture suitable for use in a melt transesterification reaction to form polycarbonate. The method comprises the steps of:

(i) providing a diaryl carbonate;

(ii) selecting a first monomer compound, wherein the melting point of the first monomer compound is below the melting point of the diaryl carbonate, (iii) performing a monomer conditioning step selected from the group consisting of:
  (a) testing the first monomer compound for the presence of alkali metal prior to forming the non-reactive monomer mixture, and if said alkali metal is present, performing a step selected from the group consisting of:
    (I) treating the first monomer compound to reduce the level of said alkali metal to an amount of less than 600 ppb,
    (II) adding an acid stabilizer to the first monomer compound, and
    (III) a combination of steps (I) and (II), and
  (b) treating the first monomer compound with a step selected from the group of:
    (I) treating the first monomer compound to reduce the level of said alkali metal to an amount of less than 600 ppb,
    (II) adding an acid stabilizer to the first monomer compound, and
    (III) a combination of steps (I) and (II), (iv) adjusting the temperature of the diaryl carbonate to a first temperature that is:

less than 40° C. above the melting point of the diaryl carbonate;

(v) adding the first monomer compound to the diaryl carbonate, wherein the first temperature is selected such that the first monomer compound added to the diaryl carbonate is dispersed (dissolves, melts, or both dissolves and melts defined in the specification) in the diaryl carbonate to produce a non-reactive monomer mixture.

In a second embodiment another method of forming a non-reactive monomer mixture is provided. The method comprises the steps of:

(i) providing a diaryl carbonate;

(ii) selecting a first monomer compound, (iii) performing a monomer conditioning step selected from the group consisting of:
  (a) testing the first monomer compound for the presence of alkali metal prior to forming the non-reactive monomer mixture, and if said alkali metal is present, performing a step selected from the group consisting of:
    (I) treating the first monomer compound to reduce the level of said alkali metal to an amount of less than 600 ppb,
    (II) adding an acid stabilizer to the first monomer compound, and
    (III) a combination of steps (I) and (II), and
  (b) treating the first monomer compound with a step selected from the group of:
    (I) treating the first monomer compound to reduce the level of said alkali metal to an amount of less than 600 ppb,
    (II) adding an acid stabilizer to the first monomer compound, and
    (III) a combination of steps (I) and (II), (iv) adjusting the temperature of the diaryl carbonate to a first temperature that is:
  greater than the melting point of the diaryl carbonate; and
  below the melting point of the first monomer compound;

(v) adding the first monomer compound as a solid to the diaryl carbonate, wherein the first temperature is selected such that the first monomer compound added to the diaryl carbonate disperses in the diaryl carbonate to produce a first monomer mixture, (vi) selecting a second monomer compound, wherein the first monomer compound requires a higher temperature to disperse in the diaryl carbonate than the second monomer compound, lowering the temperature of the first monomer mixture to a second temperature sufficiently high to maintain the first monomer compound in solution and to permit dispersion of the second monomer compound, said second temperature being above the melting point of the second monomer compound, and adding the second monomer compound to the non-reactive monomer mixture at the second temperature, wherein the second temperature is selected such that the second monomer compound added to the non-reactive monomer mixture disperses in the non-reactive monomer mixture.

In another embodiment the present invention provides a non-reactive monomer mixture. The mixture consists of a monomer component dissolved in a melted diaryl carbonate, wherein the monomer component comprises one or more monomer compounds having a melting point below the melting point of the diaryl carbonate and wherein the monomer component comprises less than 600 ppb alkali metal, an acid stabilizer, or both less than 600 ppb alkali metal and an acid stabilizer, wherein the monomer compounds of the monomer component and the diaryl carbonate are present in a mole ratio of from 0.9 to 1.1, and wherein the monomer mixture is at a temperature between the melting temperature of the lowest melting monomer compound and the melting temperature of the diaryl carbonate.

DETAILED DESCRIPTION

Figure 1:
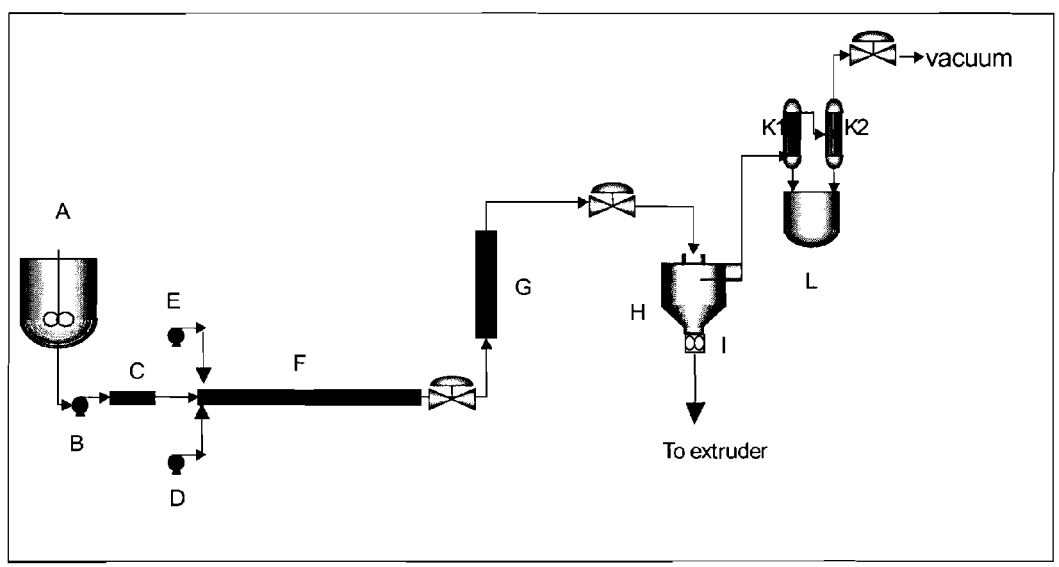
FIG. 1 is a schematic diagram of reactor systems used in the example section.
Figure 2:
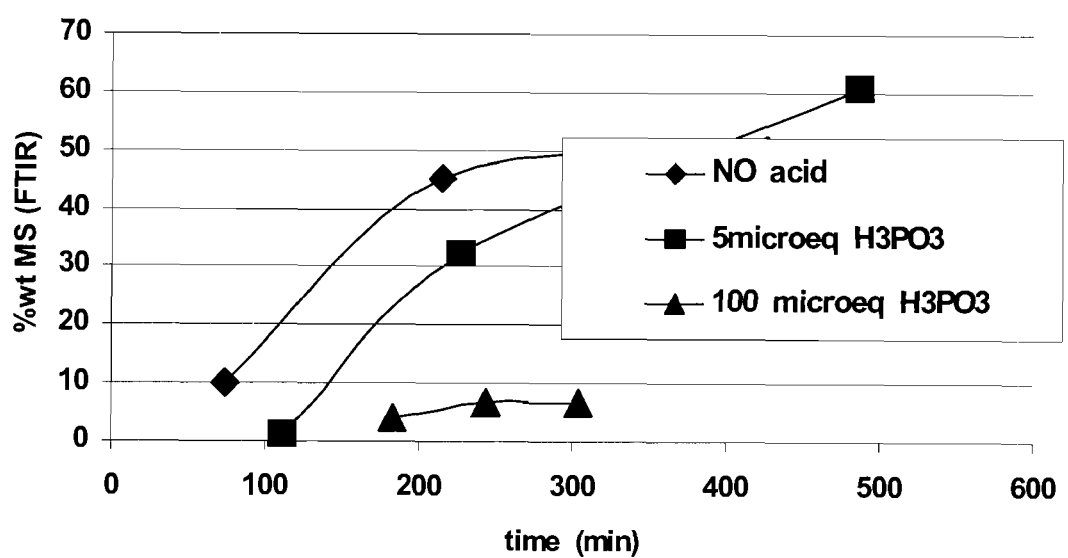
FIGS. 2-10 are graphical representations of results obtained in the example section.
Figure 3:
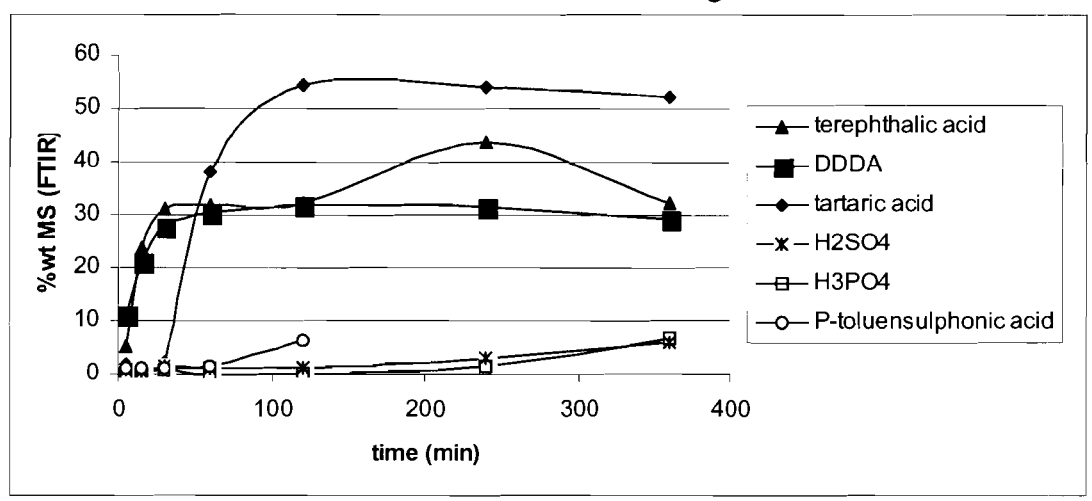

The present invention may be understood more readily by reference to the following detailed description of preferred embodiments of the invention and the examples included herein. The present invention relates to polycarbonate produced by melt transesterification reactions and to non-reactive monomer mixtures used in these processes. It has been found that polymerizing a non-reactive monomer mixture prepared according to the methods of the present invention, one is able to prepare polycarbonates having improved color among other improved properties. Furthermore, the non-reactive monomer mixtures prepared according to the methods of the present invention can be stored for later use and/or transported to polycarbonate production facilities.

Definitions

As used in the specification and claims of this application, the following definitions, should be applied.

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one monomer compound (e.g. dihydroxy compound) joined by carbonate linkages. In certain embodiments of the invention, the polycarbonate comprises residues of an aromatic dihydroxy compound and has a number average molecular weight, $M_n$, measured relative to polystyrene (PS) standards of between 10,000 g/mol and 160,000 g/mol. In specific embodiments, the $M_n$ measured relative to PS is between 13,000 g/mol and 160,000 g/mol, for example between 15,000 g/mol and 160,000 g/mol. In another embodiment, the $M_n$ (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one monomer residue unless the context is expressly limiting. Thus, the application encompasses copolycarbonates with residues of 2, 3, 4, or more types of monomer compounds.

"non-reactive monomer mixture" as it is used herein shall be understood to mean that the non-reactive monomer mixture does not substantially react to form byproducts (such as chainstopping byproducts like Sal-OH (e.g. Salicyl-OH), methyl carbonate and methyl ether, and other byproducts such as I-SC (e.g. Internal Salicyl Carbonate), polycarbonate oligomer, and/or polycarbonate polymer prior to being used in a subsequent polymerization process. It is preferred that the non-reactive monomer mixture is maintained at a temperature such that the monomer compound is maintained in a dispersed state in the diaryl carbonate. The non-reactive monomer mixture preferably will have less than 600 ppb alkali metal present and/or an acid stabilizer present to inhibit a reaction between the diaryl carbonate and the monomer compound. In one embodiment the monomer mixture will react to form polycarbonate polymer or oligomer whilst in the formed non-reactive monomer mixture where less than 15%, more preferably less than 10%, still more preferably less than 5%, and most preferably less than 2% of the diaryl carbonate present in the formed non-reactive monomer mixture is consumed. In another embodiment the monomer mixture will react to form polycarbonate polymer or oligomer whilst in the formed non-reactive monomer mixture where the rate of conversion is less than 5% per hour, preferably less than 1% per hour, more preferably less than 0.5% per hour, and most preferably less than 0.2% per hour. In one embodiment prior to or during formation of the non-reactive monomer mixture the diaryl carbonate and the monomer compound are allowed to partially react. In this later embodiment, it has been found the dissolution temperature of the monomer in the melted diaryl carbonate can be lowered for some monomer compounds, particularly those that impart high heat stability and resistance to polycarbonates.

The term "acid stabilizer" as it is used herein shall be understood to mean acidic compounds or their derivatives that quench, inactivate or deactivate undesirable components such as alkali metals and other catalytically active species and thus stabilize the non-reactive monomer mixture, such as an acid, acid salt, ester of an acid or their combinations.

The term "dispersed" as it relates to the creation of the non-reactive monomer mixture (e.g. the monomer compound disperses in the diaryl carbonate) is herein understood to mean that the monomer compound dissolves, melts, or both dissolves and melts and distributes within the diaryl carbonate.

The phrase "lowering the temperature of the non-reactive monomer mixture" is herein understood to mean that the temperature of the non-reactive monomer mixture is lowered to a temperature below that to which the diaryl carbonate is adjusted to form the non-reactive monomer mixture. The temperature of the non-reactive monomer mixture may be lowered to a temperature that is above, equal to, or below the melting point of the diaryl carbonate. For example the temperature of the non-reactive monomer mixture may be lowered to a temperature that is less than 10° C. or less than 5° C. above the melting point of the selected diaryl carbonate. In another embodiment, the temperature of the non-reactive monomer mixture is lowered to a temperature that is below the melting point of the selected diaryl carbonate. In a preferred embodiment the temperature of the non-reactive monomer mixture is lowered to a temperature where the monomer compound is maintained in solution after it has been dispersed. This temperature may be below the melting point of diaryl carbonate owing to freezing point depression of the mixture. In another preferred embodiment the temperature of the non-reactive monomer mixture is lowered to a temperature where the non-reactive monomer mixture may become partly solid or completely solid.

The "Lowest Stable Temperature" (LST) is the approximate lowest temperature at which a particular non-reactive monomer mixture composition remains liquid, free-flowing and capable of being mechanically stirred. Typically the LST is about 5° C. above the temperature at which the particular non-reactive monomer mixture either crystallizes, solidifies, or precipitates. The LST is thus the minimum temperature required to maintain a particular non-reactive monomer mixture composition in free-flowing liquid form in which it can be transferred by means of pumps, valves, fluid flow, and gravity.

As used herein the term "Lowest Dispersion Temperature" (LDT) is the lowest temperature of the diaryl carbonate where the monomer compound completely disperses in the diaryl carbonate. In some embodiments the LDT is above the melting point of the diaryl carbonate. However, in other embodiments the LDT is below the melting point of the diaryl carbonate.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement techniques of the type described in the present application to determine the value.

The Diaryl Carbonate:

In the melt production of polycarbonate, the compounds which react with the monomer compounds to form carbonate linkages (the carbonate source) may be carbonate diesters, carbonyl halides, etc. Specific examples of diaryl carbonates include: diphenyl carbonate, ditolyl carbonate, bis(chlorophenyl) carbonate, m-cresyl carbonate, and dinaphthyl carbonate. Of the various compounds of this type diphenyl carbonate (DPC) is often preferred.

The diaryl carbonate can also be derived from an activated diaryl carbonate or a mixture of an activated diaryl carbonate with non-activated diaryl carbonate. A preferred activated carbonate of the present invention is an activated diaryl carbonate such as bismethylsalicylcarbonate (BMSC). However, as used herein the term "activated diaryl carbonate" is defined as a diaryl carbonate which is more reactive than diphenyl carbonate toward transesterification reactions. Such activated diaryl carbonates are of the general formula:

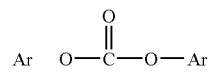

wherein Ar is a substituted aromatic radical having 6 to 30 carbon atoms. The preferred activated diaryl carbonates have the more specific general formula:

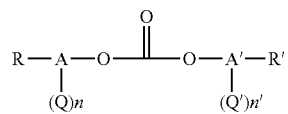

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

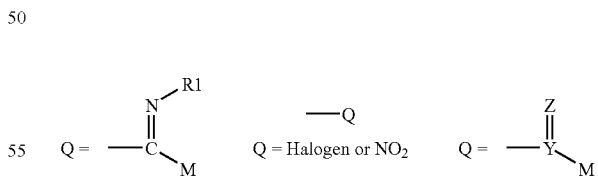

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bismethylsalicylcarbonate, bis(o-chlorophenyl)carbonate, bis(o-nitrophenyl)carbonate, bis(o-acetylphenyl)carbonate, bis(o-phenylketonephenyl)carbonate, bis(o- formylphenyl)carbonate, and bis(o-cyanophenyl)carbonate. Unsymmetrical combinations of these structures, where the substitution number and type on A and A' are different, are also possible to employ in the current invention. A preferred structure for an activated carbonate is an ester-substituted diaryl carbonate having the structure:

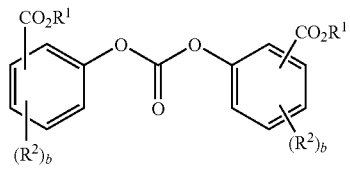

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from 0 to 4. At least one of the substituents $CO_2R^1$ is preferably attached in an ortho position relative to the carbonate group.

Examples of preferred ester-substituted diaryl carbonates include and are not limited to bismethylsalicylcarbonate (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically bismethylsalicylcarbonate is preferred for use in melt polycarbonate synthesis due to its lower molecular weight and higher vapor pressure.

One method for determining whether a certain diaryl carbonate is activated or is not activated is to carry out a model transesterification reaction between the certain diaryl carbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diaryl carbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenylcarbonate and is an activated carbonate, whereas a diaryl carbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diaryl carbonate.

Some non-limiting examples of non-activating groups which, when present in an ortho position relative to the carbonate group, would not be expected to result in activated carbonates are alkyl and cycloalkyl. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

Unsymmetrical diaryl carbonates wherein one aryl group is activated and one aryl is unactivated or de-activated would also be useful in this invention if the activating group renders the diaryl carbonate still more reactive than diphenyl carbonate.

The theoretical stoichiometry of the reaction within the melt polymerization reaction mixture requires a molar ratio of monomer composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02.

The following table illustrates representative melting points of non-limiting examples of suitable diaryl carbonates for use with the present invention.

Representative Melting Points of Diaryl Carbonates

| Carbonate | Structure | Melting Point (° C.) |
|---|---|---|
| Diphenyl carbonate | Ph–O–C(=O)–O–Ph | 78-79 |
| Ditolyl carbonate | (4-MeC$_6$H$_4$)–O–C(=O)–O–(4-MeC$_6$H$_4$) | 89-90 |
| Bis-4-nitrophenyl carbonate | (4-NO$_2$C$_6$H$_4$)–O–C(=O)–O–(4-NO$_2$C$_6$H$_4$) | 136-142 |
| Bismethyl salicyl carbonate | (2-MeO$_2$C-C$_6$H$_4$)–O–C(=O)–O–(2-CO$_2$Me-C$_6$H$_4$) | 110-115 |

The Monomer Compound:

The methods of the present invention include the step of selecting a monomer compound or compounds that have melting points below the melting point of the selected diaryl carbonate for incorporation into the non-reactive monomer mixture. In some embodiments another monomer compound or compounds are selected for incorporation into the non-reactive monomer mixture wherein the additional monomer(s) has a melting point that is greater than the melting point of the diaryl carbonate.

The monomer compounds are not limited to dihydroxy compounds or to aromatic dihydroxy compounds. For example, monomer compounds include compounds having one or more functional groups capable of reacting with a dihydroxy compound or a diaryl carbonate to give a chemical bond. Some non-limiting examples of such reactive functional groups are carboxylic acid, ester, amine functional groups and their combinations. Typical monomer compounds will have two functional groups capable of reacting with a dihydroxy compound or a diaryl carbonate; however monofunctional compounds may be used as chainstoppers or endcappers, and trifunctional or higher functional compounds may be used as branching agents. However, dihydroxy and aromatic dihydroxy compounds are frequently preferred for use in these types of applications. Suitable dihydroxy compounds and dihydroxy aromatic compounds are those as described in U.S. patent application Ser. No. 11/863,659, mentioned above.

A non-limiting list of suitable monomer compounds having lower melting points compared to a preferred diaryl carbonate BMSC (with a melting point of about 109° C.) are selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, C$_{36}$ branched fatty diol, and 1,2,6-Hexanetriol. These compounds have the structures and melting points (Mp), measured in ° C., as described in the following tables.

| Name | Structure | Mp |
|---|---|---|
| Ethylene glycol | HO–CH$_2$CH$_2$–OH | −13 |
| 1,3-Propanediol | HO–(CH$_2$)$_3$–OH | −32 |
| 1,2-Propanediol | CH$_3$CH(OH)CH$_2$OH | −60 |
| 1,4-Butanediol | HO–(CH$_2$)$_4$–OH | 20 |

| Name | Structure | Mp |
|---|---|---|
| 1,3-Butanediol | OH-CH(CH3)-CH2-CH2-OH | −54 |
| 1,5-Pentanediol | HO-(CH2)5-OH | −18 |
| 1,6-Hexanediol | HO-(CH2)6-OH | 40-43 |
| 1,7-Heptanediol | HO-(CH2)7-OH | 17-19 |
| 1,10-Decanediol | HO-(CH2)10-OH | 71-75 |
| 1,2-Cyclohexanediol | cyclohexane-1,2-diol | 73-77 |
| trans-1,2-Cyclohexanediol | trans-cyclohexane-1,2-diol | 100-104 |
| cis-1,2-Cyclohexanediol | cis-cyclohexane-1,2-diol | 98-101 |
| 1,4-Cyclohexanedimethanol | 1,4-bis(hydroxymethyl)cyclohexane | 31.5 |
| 1,2,6-Hexanetriol | HO-CH2-CH2-CH2-CH2-CH(OH)-CH2-OH | 25-32 |
| 4-Cumylphenol | C6H5-C(CH3)2-C6H4-OH | 72-75 |
| 1,4-Diaminobutane | $H_2N$-(CH2)4-$NH_2$ | 27 |
| Glutaric anhydride | glutaric anhydride | 46-57 |
| Pluronics (polypropylene glycol block copolymer) | $HO(CH_2CH_2O)_x(CHCH_3O)_y(CH_2CH_2O)_zH$ | −30-48 |

-continued

| Name | Structure | Mp |
|---|---|---|
| Isosorbide | (structure shown) | 62-64 |
| C36 Dimer acid, hydrogenated | (structure shown) m + n + o + p = 30 C · atoms | <0 |
| C36 branched Fatty diol | (structure shown) m + n + o + p = 30 C · atoms | <0 |

In the embodiment where a monomer compound having a higher melting point than that of the diaryl carbonate is also incorporated into the non-reactive monomer mixture, the latter monomer compound is not particularly limited. A non-limiting list of suitable monomer compounds having higher melting points compared to a preferred diaryl carbonate BMSC (with a melting point of 110-115° C.) are those as described in U.S. patent application Ser. No. 11/863,659, mentioned above.

The Phenolic Compound

As a melt reaction proceeds using a diaryl carbonate and monomer compound to form polycarbonate, the diaryl carbonate is consumed and a phenolic by-product is generated. The phenolic by-product is typically removed from the reaction system to drive the polymerization reaction toward higher conversion. The structure of the phenolic by-product will depend on what diaryl carbonate is employed as the carbonate source and thus can be an ester-substituted phenol or a non-ester-substituted phenol. For example, if a diaryl carbonate such as diphenyl carbonate (DPC) is employed, a typical phenolic by-product will be a non-ester-substituted phenol, such as phenol. If an activated diaryl carbonate (i.e. ester substituted diaryl carbonate) such as bismethylsalicylcarbonate (BMSC) is employed, a typical phenolic by-product will be an ester-substituted phenol such as methyl salicylate.

It is believed that a higher concentration of the phenolic compound in the reaction mixture will lead to slower polymerization rates in the mixture. It is also believed that the addition of a phenolic compound to the diaryl carbonate in the non-reactive monomer mixture will aid in delaying the polymerization reaction, aid in minimizing sublimation and/or devolatilization of monomer compounds out of solution, and increase solubility of many monomer compounds. Further, it is believed that the addition of the phenolic compound will also aid in maintaining the components in solution and prevent them from crystalizing out of solution. Thus in another embodiment of the present invention the method further comprises the addition of a phenolic compound to the diaryl carbonate. Non-limiting examples of other suitable phenolic compounds are found in U.S. application Ser. No. 11/275,110 filed on Dec. 12, 2005 which is incorporated herein by reference for all purposes.

The Acid Stabilizer:

It has also been found that the polymerization reaction can be further inhibited and/or delayed by the addition of an acid stabilizer to the non-reactive monomer mixture. The particular acid stabilizer is not particularly limited. Suitable acid stabilizers include acids, acid salts, esters of acids or their combinations. The addition of the acid or its salt or ester often deactivates catalytically active species such as alkali metals. Particularly useful classes of acids, acid salts and esters of acids are those derived from a phosphorous containing acid such as phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, fluorohypophosphoric acid or their combinations. In one embodiment a combination of a phosphorous containing acid and an ester of a phosphorous containing acid is used. Alternatively, acids, acid salts and esters of acids, such as, for example, sulphuric acid, sulphites, mono zinc phosphate, mono calcium phosphate, and the like, may be used. However, in some embodiments it has been found that the addition of a phosphorus containing acid (e.g.

$H_3PO_4$) improves properties including color properties of polycarbonate. Other suitable and non limiting examples of phosphorus containing acids and additional benefits of adding the phosphorus containing acid on the resulting polycarbonate can be found below in the example section and in U.S. patent application Ser. Nos. 11/863,659 and 11/668,551, which are incorporated herein by reference.

Forming the Non-Reactive Monomer Mixture:

In one embodiment the present invention provides a method of forming a non-reactive monomer mixture that is suitable for use in a melt transesterification reaction to form polycarbonate. In this first embodiment, the method comprises the steps of:

(i) providing a diaryl carbonate;

(ii) selecting a first monomer compound, wherein the melting point of the first monomer compound is below the melting point of the diaryl carbonate, (iii) performing a monomer conditioning step selected from the group consisting of:

(a) testing the first monomer compound for the presence of alkali metal prior to forming the non-reactive monomer mixture, and if said alkali metal is present, performing a step selected from the group consisting of:

(I) treating the first monomer compound to reduce the level of said alkali metal to an amount of less than 600 ppb, (II) adding an acid stabilizer to the first monomer compound, and (III) a combination of steps (I) and (II), and (b) treating the first monomer compound with a step selected from the group of:

(I) treating the first monomer compound to reduce the level of said alkali metal to an amount of less than 600 ppb, (II) adding an acid stabilizer to the first monomer compound, and (III) a combination of steps (I) and (II), (iv) adjusting the temperature of the diaryl carbonate to a first temperature that is:

less than 40° C. above the melting point of the diaryl carbonate;

(v) adding the first monomer compound to the diaryl carbonate, wherein the first temperature is selected such that the first monomer compound added to the diaryl carbonate is dispersed (dissolves, melts, or both dissolves and melts defined in the specification) in the diaryl carbonate to produce a non-reactive monomer mixture.

It is preferred that the method steps occur in the order listed (i.e. steps i, ii, iii, iv, and then v). However, it is herein contemplated that steps occur out of order, for example, step (v) can occur prior to step (iv), inter alia. In the former embodiment, it is preferred that the first monomer compound is added to molten diaryl carbonate. In the latter embodiment, it is preferred that the diaryl carbonate is provided as a solid and the first monomer compound is added to the diaryl carbonate and then the diaryl carbonate is melted.

The temperature of the diaryl carbonate is adjusted to a temperature which is less than 40° C. above the melting point of the selected diaryl carbonate. In a preferred embodiment the temperature is adjusted to a temperature that is less than 30° C., more preferably less than 20° C., and yet more preferably less than 10° C., for example 5° C. above the melting point of the selected diaryl carbonate.

Alkali metals (e.g. lithium, sodium, potassium, and the like) are known to be impurities in several monomer compounds and especially in dihydroxy compounds. They can be present individually or combined as salts or as some other structures with other chemicals. Alkali metals can act as a catalyst to the polymerization reaction. To reduce the tendency of the reaction mixture to react, embodiments of the present invention include a monomer conditioning step of testing and treating or simply treating the monomer compound to reduce alkali metal to a level of less than 600 ppb or adding an acid stabilizer to the monomer, or a combination of the two treatment steps. It is believed that when the alkali metal has a presence of less than 600 ppb, more preferably less than 400 ppb, for example less that 200 ppb, or where an acid stabilizer is present that its catalytic effect can be minimized. Where the monomer component is tested for the presence of the alkali metal, the testing mechanism is not particularly limited and can be accomplished by known methods of determining concentration of the alkali metal. The step of testing preferably occurs at the location of formation of the non-reactive monomer mixture. However, the step of testing may be performed "offsite", for example at the monomer's production facility or somewhere in between for example at a third party certification agency, laboratory, or warehouse where the product is tested and assigned an alkali metal grading value. In this later embodiment where the monomer is assigned the alkali metal grading value "offsite", the formation of the non-reactive monomer mixture will proceed based on the assigned alkali metal grading value of the monomer selected for the formation of the non-reactive monomer mixture. For example where a monomer is assigned an alkali metal grading value of less than 600 ppb alkali metal at an off-site location (e.g. a third party chemical supplier), that monomer may be ordered from the supplier and used in the production of the non-reactive monomer mixture and such use falls within the scope of the step "testing the monomer compound for the presence of alkali metal prior to forming the non-reactive monomer mixture". The step of treating the monomer to reduce alkali metal level likewise is not particularly limited and can occur by known purification methods such as washing and/or distillation. The step of testing and/or treating the monomer component may occur before, during, or after the formation of the non-reactive monomer mixture.

It is believed that the addition of the acid stabilizer also aids in hindering the catalytic effect of the alkali metal and hence in delaying the transesterification reaction to form polycarbonate oligomer and polymer. In one example, the acid stabilizer is added to the monomer component by itself or when it is combined with other reactants. Where the acid stabilizer is added, the addition mechanism is not particularly limited and may be accomplished by known methods of adding additives. The step of adding the acid stabilizer preferably occurs at the location of formation of the non-reactive monomer mixture. However, the step of adding the acid stabilizer may be performed "offsite", for example at the monomer's production facility or somewhere in between for example at a third party toll manufacturer where the acid stabilizer is added to a monomer component in a specified amount. In this later embodiment where the acid stabilizer is added to the monomer component "offsite", the formation of the non-reactive monomer mixture will proceed based on the specified acid stabilizer level of the monomer selected for the formation of the non-reactive monomer mixture. For example where a monomer is specified to have a content of acid stabilizer of between 0.1 and 200 ppm at an off-site location (e.g. a third party chemical supplier), that monomer may be ordered from the supplier and used in the production of the non-reactive monomer mixture and such use falls within the scope of the step "adding an acid stabilizer to the second monomer compound".

In one embodiment the amount of acid stabilizer added is in an amount such that it is present in the non-reactive monomer mixture between 0.1 and 250 ppm, in other embodiments it is between 1 and 100 ppm. The preferred amount of acid stabilizer on a weight basis (ppm) will depend on factors such as the molecular weight, number of acidic protons per molecule, thermal stability and volatility of the acid stabilizer. The preferred amount will also depend on the temperature of the non-reactive monomer mixture and the amount of basic and/or catalytic impurity species contained in it. For example, adding high amounts of acid stabilizer or adding it repeatedly as a function of time may be used to compensate for loss of the acid stabilizer.

Some monomers such as those imparting high heat stability properties like phenolphthanilide, a.k.a. 2-Phenyl-3,3-Bis (4-Hydroxyphenyl) Phthalimidine (i.e. PPP-BP, CAS #6607-41-6), may have enhanced solubility if they are first allowed to partially react with the diaryl carbonate. In this case, it may be advantageous to prepare the monomer solution without the acid stabilizer being present, optionally in the presence of added catalyst, and then adding an acid stabilizer after all of the monomers are dissolved in order to convert the monomer mixture into a non-reactive monomer mixture.

As described above, the monomer compound is added to the diaryl carbonate before, during, and/or after the temperature of the diaryl carbonate is adjusted. The temperature of the monomer compound when it is added to the diaryl carbonate is not particularly limited. However, in a preferred embodiment the monomer compound is at a temperature equal to or below that of the adjusted temperature of the diaryl carbonate. Depending upon the melting temperature of the selected monomer compound it may be a liquid or solid when added to the diaryl carbonate. In a preferred embodiment the temperature of the monomer compound when it is added to the diaryl carbonate is at a temperature between 20° C. and the melting temperature of the diaryl carbonate. In a more preferred embodiment the temperature of the monomer compound when it is added to the diaryl carbonate is at a temperature between 20° C. and 40° C., more preferably between 20° C. and 30° C., for example at room temperature (22° C.).

In the embodiment where the temperature of the monomer compound, when it is added to molten diaryl carbonate, is at a temperature less than that of the melting point of the diaryl carbonate, it may be desirable to continue heating the diaryl carbonate/monomer mixture during the addition of the monomer compound to ensure that the monomer disperses in the mixture. In another embodiment, the adjusted temperature of the molten diaryl carbonate and the adjusted temperature of the monomer compound are selected such that an energy balance of the total components provides a final desired temperature of the non-reactive mixture where the monomer compound is dispersed in the diaryl carbonate.

In one embodiment the diaryl carbonate and the monomer compound are added at room temperature to a stirred vessel. In this embodiment the monomer compound may be in solid form depending upon its melting point. The vessel, and the diaryl carbonate and the monomer compound, are heated to a temperature that is greater than the melting point of the diaryl carbonate. The amount of the monomer compound added to the diaryl carbonate and the temperature are selected such that the monomer compound dissolves in the diaryl carbonate to produce a non-reactive monomer mixture. In a preferred embodiment the monomer compound and the diaryl carbonate are present in a mole ratio of from 0.9 to 1.1.

In another embodiment the diaryl carbonate is added as a solid to a stirred vessel. The temperature of the vessel, and the diaryl carbonate, are adjusted to a temperature above the melting point of the diaryl carbonate and it is melted. The temperature of the diaryl carbonate within the vessel is also above the melting point of a selected monomer compound. The monomer compound is then added to the melted diaryl carbonate where it disperses to form a non-reactive monomer mixture.

In another embodiment the diaryl carbonate is added as a solid to a stirred vessel. The temperature of the vessel, and the diaryl carbonate, are adjusted to a temperature above the melting point of the diaryl carbonate and it is melted. A monomer compound having a melting point below the melting point of the diaryl carbonate is added to the diaryl carbonate in the vessel either before, during, or after it is melted. The temperature of the diaryl carbonate (now also containing the monomer compound having a melting point below the melting point of the diaryl carbonate) within the vessel is also below the melting point of a first selected monomer compound having a melting point above the melting point of the diaryl carbonate. The first monomer compound is then added to the melted diaryl carbonate.

In another embodiment the diaryl carbonate is added as a solid to a stirred vessel. The temperature of the vessel, and the diaryl carbonate, are adjusted to a temperature above the melting point of the diaryl carbonate and it is melted. A first monomer compound having a melting point above the melting point of the diaryl carbonate is added to the diaryl carbonate in the vessel that is adjusted to a temperature below the melting point of the first monomer, either before, during, or after melting, such that it disperses in the diaryl carbonate. The temperature of the diaryl carbonate (now also containing the first monomer compound) is adjusted to a lower temperature and a second monomer compound, having a melting point below the diaryl carbonate, is introduced. The second monomer disperses in the diaryl carbonate/first monomer mixture to form a non-reactive monomer mixture.

In another embodiment the monomer is added to a stirred vessel. The temperature of the vessel, and the monomer compound, are adjusted to a temperature above the melting point of the diaryl carbonate. The diaryl carbonate is added to the vessel and is adjusted to a temperature above its melting point and it is melted, where the monomer compound disperses in the melted diaryl carbonate.

In one embodiment the above process occurs in a batch process where the total amount of monomer compound and diaryl carbonate are determined and measured prior to forming the non-reactive mixture and that the process occurs to produce a predetermined amount of non-reactive monomer mixture as a feedstock for a subsequent polymerization run.

In yet another preferred embodiment it is possible to produce a non-reactive monomer mixture continuously where the method further comprises the step of continuously drawing off a non-reactive monomer mixture. The steps of providing a diaryl carbonate and adding the monomer compound to the diaryl carbonate can be performed either continuously or semi-continuously at various stages. In the continuous production mode it may be difficult to maintain a constant molar ratio of monomer compound/diaryl carbonate and care should be taken to ensure desired molar ratios in the resulting monomer mixture.

The amount of monomer compound and the amount of diaryl carbonate are preferably present in a molar ratio (moles monomer compound/mole diaryl carbonate) between 0.8 to 1.2, and more preferably between 0.9 and 1.1. In another embodiment a further monomer compound is added to the non-reactive monomer mixture, where the further monomer compound also has a melting point below that of the diaryl carbonate. In this embodiment, the further monomer compound is added at any point during the formation of the non-reactive monomer mixture. However, it is preferred that a scheme be developed where the monomer compounds are added where the highest melting monomers are added prior to lower melting monomers.

In another embodiment after the non-reactive monomer mixture has been prepared the temperature of the monomer mixture may be lowered toward or below the melting temperature of the diaryl carbonate and stored for more than 1 hour, for example 12 hours or more than 24 hours. In a preferred embodiment this time period is often between 1 and 6 hours, inclusive. In this embodiment it is preferred that the temperature is lowered to a temperature that is 5 or more degrees above the LST, for example 10, 15, or 20 degrees above LST on the prepared non-reactive monomer mixture. In one embodiment, the temperature of the non-reactive monomer mixture is maintained at a temperature of between 120 and 150° C. and stored for a period of from 0.5 to 8 hours. In another embodiment the temperature of the non-reactive monomer mixture is lowered to a temperature where the non-reactive monomer mixture becomes solid or partly solid. In this embodiment, the non-reactive monomer mixture may be lowered to a temperature below 100° C. or to or below room temperature. This non-reactive monomer mixture may be stored, transported, and subsequently used in a melt transesterification reaction. Such amorphous solidified non-reactive monomer mixtures are surprisingly stable and generally can be remelted at temperatures between the LST and the LDT.

The step of lowering the temperature of the non-reactive monomer mixture may be accompanied with the addition of a further monomer compound to the non-reactive monomer mixture. In this embodiment a further monomer compound is selected, wherein the first monomer compound requires a higher temperature to dissolve in the diaryl carbonate than the second monomer compound. The non-reactive monomer mixture is lowered to a second temperature sufficiently high to maintain the first monomer compound and diaryl carbonate in solution and to permit dissolution of the second monomer compound. The second temperature being between the LST of the monomer mixture and less than 30° C., more preferably less than 20° C., for example less than 10° C. or 5° C. above the melting point of the diaryl carbonate. The second monomer compound is added to the mixture at the second temperature and disperses thereby forming a non-reactive monomer mixture comprising the first and second monomer compounds dissolved in the diaryl carbonate. The temperature of this mixture may again be dropped toward or below the LST or lowest stable temperature of the mixture as described above. In a preferred embodiment the second monomer compound is treated similarly to the first monomer compound where it is tested and treated or simply treated to either reduce the alkali metal concentration or to add an acid stabilizer. In still another preferred embodiment the amount of acid stabilizer added to stabilize the first monomer compound is suitable also to stabilize the second or subsequently added monomer compounds.

In another embodiment the method of forming a non-reactive monomer mixture may further comprise the step of adding a phenolic compound to the diaryl carbonate. It is believed that the addition of the phenolic compound will help to maintain the mixture in a non-reactive state since the rate of the polymerization reaction is largely dependent upon presence of the phenolic by-product. In preferred embodiments this step will occur prior to and/or with the addition of the monomer compound. However, the addition of the phenolic compound to the diaryl carbonate may occur before, during, or after the formation of the non-reactive monomer mixture. En one example, where the phenolic compound is "added to the diaryl carbonate" during the formation of the non-reactive monomer mixture, it is added to the vessel after any of the steps to prepare the mixture. In another example, where the phenolic compound is "added to the diaryl carbonate" after the formation of the non-reactive monomer mixture, it is added to the mixture itself. In one embodiment it has been found that the presence of the phenolic compound (e.g. methyl salicylate), helps to curb the transesterification reaction thereby aiding in the prevention of substantial polymerization of the non-reactive monomer mixture and, in some cases, to act as a cosolvent for the monomers. Furthermore, the addition of the phenolic compound has been found to minimize crystallization of the monomer within the mixture or on surfaces of the preparation vessel. In a preferred embodiment, the phenolic compound is added such that its concentration is between 0.1 and 40 weight % of the total weight of the monomers in the non-reactive monomer mixture, for example between 0.2 and 30 weight %, and more preferably in a weight % of between 2 and 25. As described above, if the diaryl carbonate employed is bismethylsalicylcarbonate (BMSC) the preferred phenolic compound for addition is the degradation by-product of BMSC (i.e. methyl salicylate) as compared to phenol for systems using DPC as the diaryl carbonate, where the preferred phenolic compound is phenol.

In another embodiment, the method of the present invention comprises steps from one or more embodiments described above. For example, in yet a further embodiment another method of forming a non-reactive monomer mixture is provided. The method comprises the steps of:

(i) providing a diaryl carbonate;

(ii) selecting a first monomer compound, (iii) performing a monomer conditioning step selected from the group consisting of:
    (a) testing the first monomer compound for the presence of alkali metal prior to forming the non-reactive monomer mixture, and if said alkali metal is present, performing a step selected from the group consisting of:
        (I) treating the first monomer compound to reduce the level of said alkali metal to an amount of less than 600 ppb,
        (II) adding an acid stabilizer to the first monomer compound, and
        (III) a combination of steps (I) and (II), and
    (b) treating the first monomer compound with a step selected from the group of:
        (I) treating the first monomer compound to reduce the level of said alkali metal to an amount of less than 600 ppb,
        (II) adding an acid stabilizer to the first monomer compound, and
        (III) a combination of steps (I) and (II), (iv) adjusting the temperature of the diaryl carbonate to a first temperature that is:
    greater than the melting point of the diaryl carbonate; and
    below the melting point of the first monomer compound;

(v) adding the first monomer compound as a solid to the diaryl carbonate, wherein the first temperature is selected such that the first monomer compound added to the diaryl carbonate disperses in the diaryl carbonate to produce a first monomer mixture, (vi) selecting a second monomer compound, wherein the first monomer compound requires a higher temperature to disperse in the diaryl carbonate than the second monomer compound, lowering the temperature of the first monomer mixture to a second temperature sufficiently high to maintain the first monomer compound in solution and to permit dispersion of the second monomer compound, said second temperature being above the melting point of the second monomer compound, and adding the second monomer compound to the non-reactive monomer mixture at the second temperature, wherein the second temperature is selected such that the second monomer compound added to the non-reactive monomer mixture disperses in the non-reactive monomer mixture.

The Non-Reactive Monomer Mixture

The present invention also provides a non-reactive monomer mixture that is suitable for use in a polymerization reaction to form polycarbonate. The mixture consists of a monomer component dissolved in a melted diaryl carbonate, wherein the monomer component comprises one or more monomer compounds having a melting point below the melting point of the diaryl carbonate and wherein the monomer component comprises less than 600 ppb alkali metal, an acid stabilizer, or both less than 600 ppb alkali metal and an acid stabilizer, wherein the monomer compounds of the monomer component and the diaryl carbonate are present in a mole ratio of from 0.9 to 1.1, and wherein the monomer mixture is at a temperature between the melting temperature of the lowest melting monomer compound and the melting temperature of the diaryl carbonate.

In one embodiment the mixture further comprises an ester substituted phenol such as methyl salicylate where the diaryl carbonate is BMSC or phenol where the diaryl carbonate is DPC. In another embodiment the non-reactive monomer mixture comprises phosphorus containing acid as the acid stabilizer. This non-reactive monomer mixture can then be stored for later use or transport to a polycarbonate production facility. The non-reactive monomer mixture is preferably stored subject to above, at a temperature less than 200° C., more preferably less than 180° C., 170° C., 160° C. and most preferably less than 150° C., for example at room temperature and/or as a solid.

Forming Polycarbonate from the Non-Reactive Monomer Mixture:

The non-reactive monomer mixture described in any of the embodiments as described above may be used in the formation of polycarbonate in a subsequent melt polymerization reaction by adding a catalyst and allowing the mixture to react under melt polymerization conditions. Melt polymerization reactions that create the transesterification between the free hydroxyl ends of dihydroxy compounds with the carbonate source are known and are not particularly limited with respect to the present invention. For example, U.S. patent application Ser. Nos. 11/863,659, 11/427,861, and 11/427,885, which are incorporated herein by reference for all purposes, disclose preferred processes and catalysts for the melt production of polycarbonate.

EXAMPLES

Having described the invention in detail, the following examples are provided. The examples should not be considered as limiting the scope of the invention, but merely as illustrative and representative thereof.

(WE) as used herein is understood to mean "working example" while (CE) is understood to mean "comparative example". The terms "working" and "comparative" are simply used to demonstrate comparisons to other examples. A comparative example may or may not be an example within the scope of the present invention. CSTR stands for continuous flow stirred-tank reactor.

Example 1

Preparation and Properties of Various Non-Reactive Monomer Mixtures Having Monomer Compounds with Melting Points Above that of the Selected Diaryl Carbonate The melting point of certain desirable monomer compounds, used in melt polymerization processes to produce polycarbonate, is often higher than that of the desired diaryl carbonate compound. For example, the melting point of BPA is about 158° C. and that of BMSC is about 109° C. However, the melting points of other desirable monomer compounds is less than that of the desired diaryl carbonate. For example the melting point of isosorbide (IS) is about 60-70° C. Prior to the present invention, to prepare monomer mixtures one would melt all monomers and diaryl carbonate together by combining the components and heating to the highest melting point of the individual components (e.g. BPA in the present case). This approach has the problem that often monomers with low melting points may start to degrade at high temperatures, especially thermally sensitive monomers like IS. Therefore, a non-reactive monomer mixture should be prepared at the lowest possible temperature. The present illustration shows how to prepare such mixtures where the non-reactive monomer mixture comprises a monomer compound with a melting point below that of the selected diaryl carbonate. The Table below shows the compositions prepared in the present illustration.

Compositions and Lowest Stable Temperature (LST)

| Test | Monomer 1 | Tm (° C.) | Monomer 2 | Tm (° C.) | LST (° C.) |
|---|---|---|---|---|---|
| WE 1 | 100% IS (high Na) | 60-70 | — | — | 95 |
| WE 2 | 100% IS (low Na) | 60-70 | — | — | 105 |
| WE 3 | C36-diol | LRT | — | — | 110 |
| WE 4 | 50% BPA | 158-159 | 50% IS (low Na) | 60-70 | 105 |
| WE 5 | 100% IS (low Na) | 60-70 | — | — | 115 |
| WE 6 | 100% IS (low Na) | 60-70 | — | — | 105 |
| WE 7 | 50% BPA | 158-159 | 50% IS (low Na) | 60-70 | 115 |

WE = Working Example
LRT = Liquid at Room Temperature

Working Example 1

IS (High Na)

Figure 4:
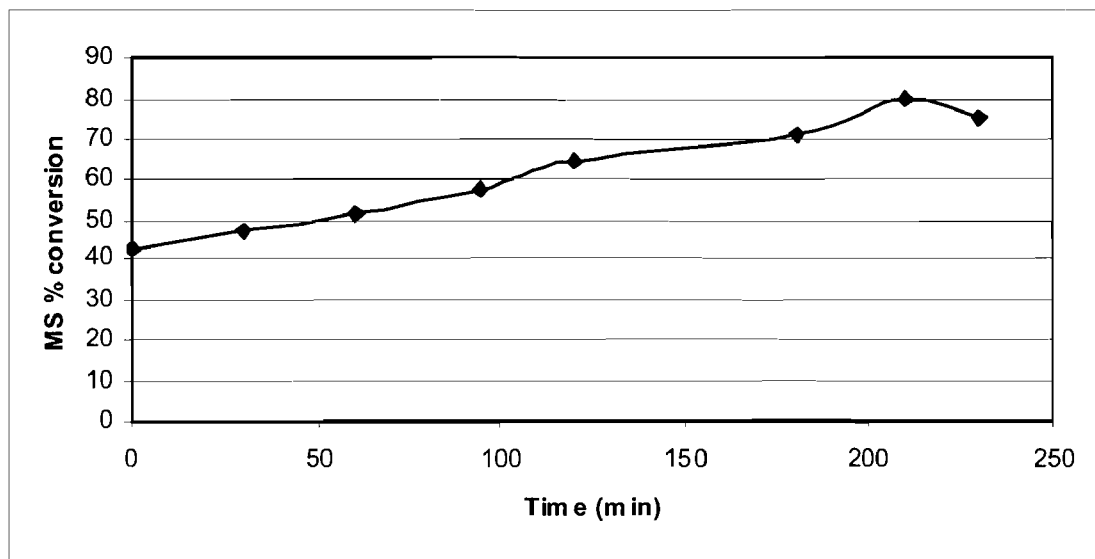

12.0010 g of BMSC and 5.2031 g of IS were loaded into a glass three-neck round bottom flask. The powders were flushed with nitrogen and heated to 120° C., under vigorous stirring and a slight over pressure of nitrogen. 20 minutes after the temperature reached 120° C. the powders were completely dissolved and a clear transparent mixture was observed. As a next step the temperature was lowered to determine Lowest Stable Temperature (LST) (e.g. the minimum temperature that was needed to maintain a clear and transparent mixture that was not too viscous to mix or started to crystallize). For this experiment the Lowest Stable Temperature (LST) was 95° C. The mixture was kept at this temperature for 4 hours during which the conversion was determined by analyzing the sample on MS concentration by high performance liquid chromatography (HPLC). This sample had 80% conversion (see FIG. 4).

Figure 5:
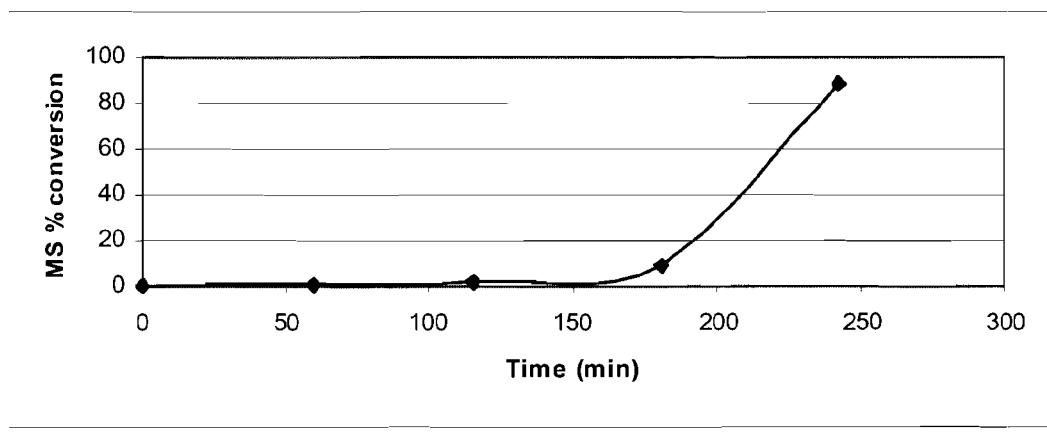

In order to prevent this high conversion from occurring, 200 ppm of phosphoric acid was added giving a delay in the reactivity as shown in FIG. 5.

Working Example 2

IS (Low Na)

Figure 6:
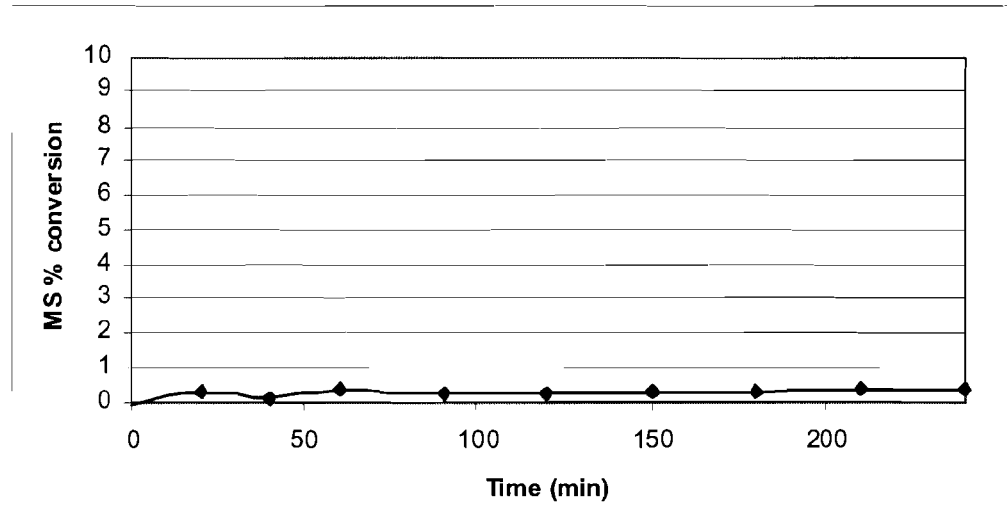

12.0001 g of BMSC and 5.2021 g of IS were loaded a glass three-neck round bottom flask. The powders were flushed with nitrogen and heated to 120° C., under vigorous stirring and a slight over pressure of nitrogen. When the temperature reached 120° C. the powders were completely dissolved and a clear transparent mixture was obtained. As a next step the temperature was lowered to determine the LST. For this experiment the LST was 105° C. The mixture was kept at this temperature for 4 hours after which the conversion was determined by analyzing the sample on MS concentration by HPLC. This sample had 4-6% conversion (see FIG. 6).

Working Example 3

Figure 7:
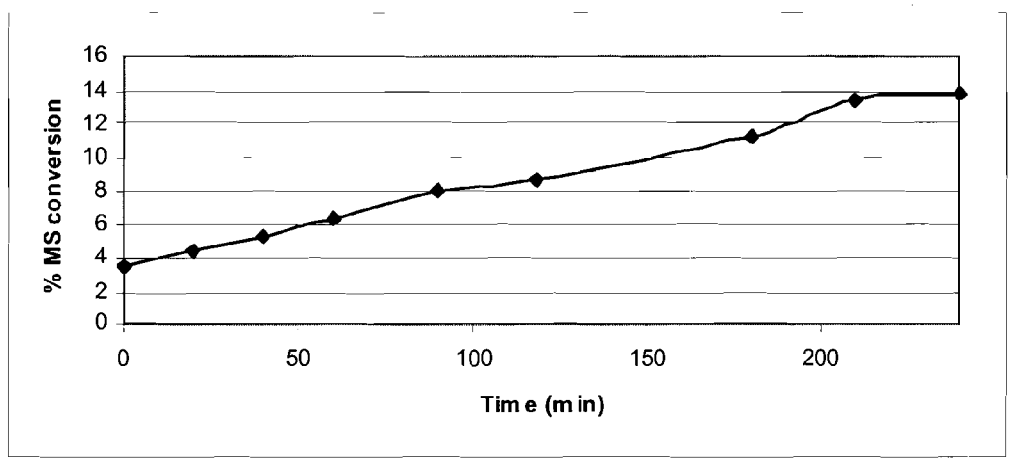

$C_{36}$-diol 6.4998 g of BMSC and 10.9366 g of $C_{36}$-diol were loaded into a glass three-neck round bottom flask. The powders were flushed with nitrogen and heated to 120° C., under vigorous stirring and a slight over pressure of nitrogen. When the temperature reached 120° C. the powders were completely dissolved and a clear transparent mixture was obtained. As a next step the temperature was lowered to the LST of the mixture. For this experiment the LST was 110° C. The mixture was kept at this temperature for 4 hours after which the conversion was determined by analyzing the sample on MS concentration by HPLC. This sample had 14% conversion (see FIG. 7).

Figure 8:
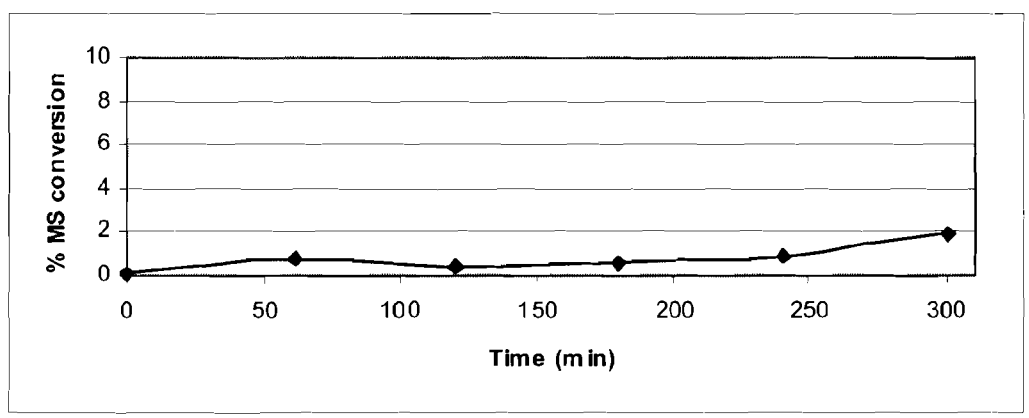

In order to prevent this high conversion from occurring 200 ppm of phosphoric acid was added giving a delay in the reactivity as shown in FIG. 8.

Working Example 4

BPA/IS (Low Na) (50/50)

Figure 9:
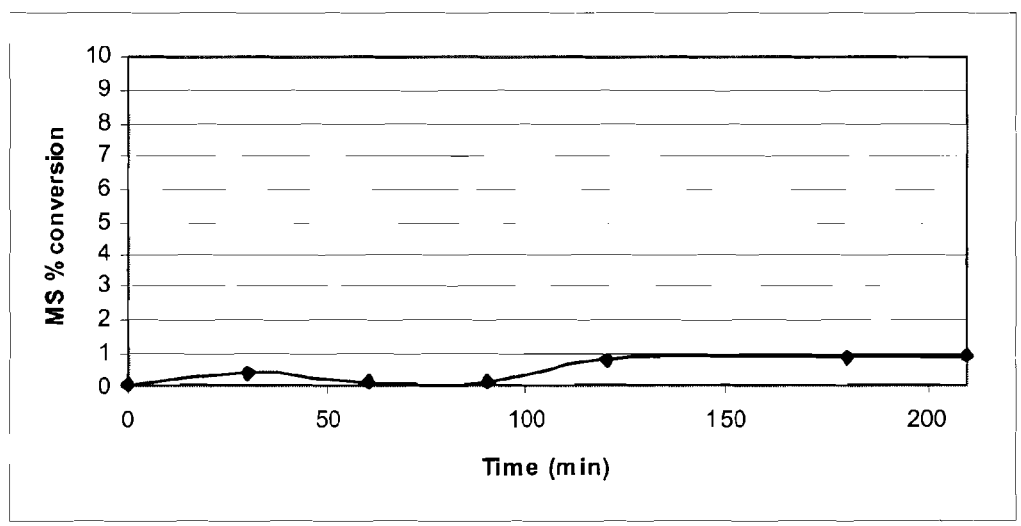

11.0011 g of BMSC is loaded into a glass three-neck round bottom flask. The powder was flushed with nitrogen and heated to 120° C., under vigorous stirring and a slight over pressure of nitrogen. When the temperature reached 120° C. the powder was completely dissolved and a clear transparent mixture was obtained. As a next step the temperature was lowered to 115° C. and subsequently the BPA/IS mixture, 3.7267 g BPA and 2.3861 g IS, was added. When the mix was a homogeneous melt the temperature was further decreased to the LST, which was 105° C. The mixture was kept at this temperature for 4 hours after which the conversion was determined by analyzing the sample on MS concentration by HPLC. This sample had less than 1.5% conversion (see FIG. 9).

Working Example 5

IS (Low Na) (100)—IS to Molten BMSC 12.0010 g of BMSC was loaded into a glass three-neck round bottom flask. The powder was flushed with nitrogen and heated at 120° C. until it was molten. As a second step the temperature was lowered to 115° C. Subsequently a total of about 25 g of IS was added to the molten BMSC in small portions and the mixture was mixed for about 10 minutes after which it was completely molten.

Working Example 6

IS (Low Na) (100)—BMSC to Molten IS 5.0014 g of IS was loaded into a glass three neck round bottom flask. The powder was flushed with nitrogen and heated at 120° C. until it was molten. As a second step the temperature was lowered to 115° C. Subsequently about 25 g of BMSC was added to the molten IS in small portions and the mixture was mixed for about 10 minutes after which it was completely molten.

Working Example 7

BPA/IS (Low Na) (50/50)—BPA to Molten BMSC/IS Mix 11.0011 g of BMSC and 2.3861 g of IS were loaded into a glass three-neck round bottom flask. The powder was flushed with nitrogen and heated at 120° C. until it was molten. As a second step the temperature was lowered to 115° C. Subsequently 3.7267 g of BPA was added to the molten BMSC/IS and the mixture was mixed for about 20 minutes after which it was completely molten.

Discussion of Example 1:

A new method is described herein for keeping/maintaining monomer mixtures in melt at a temperature well below the melting point of the component with the highest melting point. From WE 1 to WE 4 one can clearly see the benefit of this method. In the table below a comparison is made between the melting points of each component, and the LST for the compositions tested.

| Test | Monomer 1 | Tm (° C.) | Monomer 2 | Tm (° C.) | LST (° C.) |
|---|---|---|---|---|---|
| WE 1 | 100% IS (high Na) | 60-70 | — | — | 95 |
| WE 2 | 100% IS (low Na) | 60-70 | — | — | 105 |
| WE 3 | C36-diol | LRT | — | — | 110 |
| WE 4 | 50% BPA | 158-159 | 50% IS (low Na) | 60-70 | 105 |

*Tm BMSC: 109° C.

This table shows very clearly that the LST of each composition is always lower compared to the component with the highest melting point. This means it is not needed to go up to the highest melting point in order to get a homogeneous melt. In other words the monomers with the higher melting points are dissolved in the monomer with the lower melting point. Because WE1 and WE3 showed to have significant reactivity these tests were repeated but now in the presence of phosphoric acid. This delayed the reactivity and therefore delayed the formation of potential byproducts It is also shown in WE 5-7 that the order in which the reactor is loaded or the order in which the monomers are individually molten does not interfere much with the final LST. This shows that the invention is not limited to just one way of loading the reactor.

Example 2

Polymerization of a Non-Reactive Monomer Mixture in a Reactor System Comprising a Batch Reactor and a CSTR in Combination with a Reactive Extruder

Working Example 8

Polymerization of Terpolymer Non-Reactive Monomer Mixture Not Containing Catalyst at 115° C.

Figure 10:
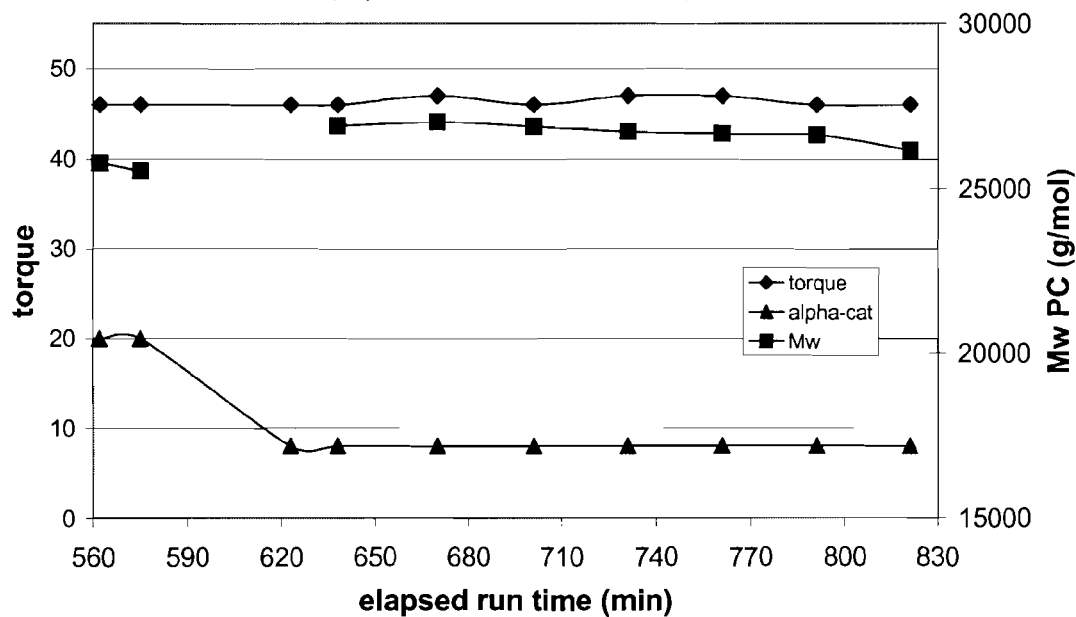

A composition of BPA/PPP-BP 65/35 and 15% w/w polypropylene glycol block copolymer (e.g. Pluronics PE3500) was dissolved in BMSC in a first stirred tank at a temperature of 175° C. and a pressure of 800 mbar. No catalyst solution was initially added to the formulation, and the formulated BMSC/diol mol ratio was 1.023. After a homogenous solution was obtained, temperature of the batch reactor was reduced to 115° C. A catalyst solution of 25 eq of TMAH and 2 eq NaOH (relative to total diol) was also fed with the non-reactive monomer mixture to a CSTR. After 2.5 hours of equilibration time, the non-reactive monomer mixture feed to the CSTR was restarted and the oligomer in the CSTR was continuously fed together with an alpha catalyst solution to a ZSK-25 reactive extruder at a rate of 11.5 kg./hr. This alpha catalyst solution was sufficiently concentrated to give an additional alpha catalyst loading of 1 to 6 eq of Na catalyst (depending on addition rate) relative to the total diol content of the formulation. The ZSK-25 reactive extruder is a 25 mm diameter, twin screw, co-rotating, intermeshing extruder having a length to diameter ratio (LOD) of about 59. Extrusion at standard conditions obtained a polymer with an average PC Mw 26,500 g/mol. No operational issues were observed during the run. A graphical representation of the data obtained over the time of continuous operation is given in FIG. 10.

Polymer Mw stability and byproduct formation were improved versus a batch run with the same composition. The following table shows a comparison of polymer data for a batch oligomerization versus a continuous polymerization of a non-reactive monomer mixture containing BPA/PPP-BP/Pluronics PE3500.

reactor/flash devolatilization/reactive extruder hybrid system shown in FIG. 1. In this system the batch reactor (A) is charged at ambient temperature and pressure with the diol monomers, solid BMSC, and a solid monofunctional phenol capping agent para-cumyl phenol (PCP). The PCP capping agent is added in amounts to yield approximately 40 mole % of PCP end groups at the targeted molecular weight. The standard BMSC/diol monomer molar ratio is 1.02. After this the monomer mix reactor is sealed shut. The system is deoxygenated by briefly evacuating the monomer mix reactor and then introducing nitrogen. This process is repeated three times. Then, in order to melt the diaryl carbonate and prepare the non-reactive monomer mixture, the pressure is set to 800 mbar and the temperature is increased at about 120° C. The liquid mixture is continuously stirred and when a clear solution is obtained the temperature is reduced to 120° C.

Using a piston pump (B), the molten monomer mix is then fed to a preheater (C). This preheater heats up the monomer mix to the desired oligomerization temperature. After the preheater, the catalyst solution (tetrametylammonium hydroxide and/or sodium hydroxide aqueous solution) is added by using pumps (D) and (E). The oligomerization reaction takes place in the plug flow reactor (F). The oligomerization temperatures typically range between 150 and 230° C., the residence time in the plug flow reactor varies between 2-10 minutes. The pressure is typically kept at about 4 bar, in order to ensure that no vapor phase is formed.

The oligomer is then fed to the preheater (G). The temperature in this preheater range between 150 and 240° C. The pressure is kept below 500 mbar in order to start evaporation of methyl salicylate (MS). The concentration of MS remaining in the liquid phase (oligomer) varies between about 10 and 20 wt %. Then, the oligomer mixture is fed through the distributor into the flash vessel (H). In the flash vessel, additional MS is removed and molecular weight is further increased. En the flash vessel the pressure typically varies between 50 and 300 mbar, the temperature is kept between 150 and 240° C.

The MS evaporated leaves the flash vessel and condenses in condensers (K1) and (K2). It is collected as a liquid in storage vessel (L).

The oligomer is pumped out of the flash vessel to the extruder using the gear pump (I). The amount of MS in this oligomer varies between 0.5 and 20 wt %, depending on the temperature and pressure settings of the flash vessel.

| | Average Polymer Analytical Data | | | | | |
|---|---|---|---|---|---|---|
| Polymerization Method | Mw PC (g/mol) | delta Mw PC/h | MS (ppm) | I-SC (mole %) | Methyl Carbonate (mole %) | Sal-OH (ppm) |
| Batch Oligomerization | 26,000 | −330 | 161 | 1.13 | 0.56 | 161 |
| Continuous Polymerization of Monomer Solution | 26,500 | 90 | 135 | 0.47 | 0.42 | 135 |

Example 3

Polymerization of Non-Reactive Monomer Mixture on Plug-Flow Reactor/Flash Devolatilization/Reactive Extruder Hybrid System In this illustration the non-reactive monomer mixtures described herein can be polymerized using the plug-flow The extruder used is a ZSK-25 type extruder as previously described. The oligomer was fed to the extruder at a rate between 5 and 25 kg/h. The screw speed varies between 300 and 500 rpm. The barrels of the extruder are set at 300° C., the die head at 310° C. The ZSK-25 extruder is equipped with a high vacuum system to further remove the methyl salicylate formed as a byproduct in the polycondensation reaction. Polycarbonate is removed from the extruder.

Example 4

Preparation and Properties of Various Non-Reactive Monomer Mixtures Having Monomer Compounds with Melting Points Above AND Below that of the Selected Diaryl Carbonate Example 4 is an Example as described in U.S. patent application Ser. No. 11/863,659 filed on Sep. 28, 2007, which is incorporated herein by reference for all purposes.

Description of General Procedure to The Lowest Dissolution Temperature (LDT) and Lowest Stable Temperature (LST) of Non-Reactive Monomer Mixtures:

The Lowest Dissolution Temperature (LDT) is the approximate lowest temperature at which a homogenous solution can be prepared within a period of less than about an hour from a particular non-reactive monomer mixture composition. In other words, the LDT is the lowest temperature at which the least soluble component of a particular non-reactive monomer mixture composition dissolves in the other components to give a mixable, low viscosity, free-flowing non-reactive monomer mixture within a period of about 1 hour. The LDT is thus the minimum temperature required to prepare a particular non-reactive monomer mixture composition.

The Lowest Stable Temperature (LST) is the approximate lowest temperature at which a particular non-reactive monomer mixture composition remains liquid, free-flowing and capable of being mechanical stirred. Typically the LST is about 5° C. above the temperature at which the particular non-reactive monomer mixture crystallizes, solidifies, or precipitates. The LST is thus the minimum temperature required to maintain a particular non-reactive monomer mixture composition in free-flowing liquid form in which it can be transferred by means of pumps, valves, fluid flow and gravity.

The following process was carried out for determining the LDT and LST values of the example non-reactive monomer mixture composition. Bismethylsalicylcarbonate (BMSC) was used as the carbonate source in all of these experiments, and a stoichiometric molar ratio of 1.02 (BMSC/diols) was used. In the case of poly(carbonate-co-ester)s, the stoichiometric molar ratio was also 1.02 (BMSC/(diols+diacids)). The monomers of the non-reactive monomer mixture formulation were weighed out into a round-bottom flask, and the flask was then purged with nitrogen. The flask was then heated to 115° C. and subsequently heated in steps of 10° C. per 10 minutes under vigorous stirring with a magnetic stir bar and under a slight overpressure of nitrogen. The temperature at which all of the components dissolved to give a homogeneous transparent mixable solution was then recorded as the LDT for that composition.

After the LDT was reached for a particular non-reactive monomer mixture composition, the non-reactive monomer mixture was allowed to cool in steps of 10° C. per 10 minutes under vigorous stirring with a magnetic stir bar and under a slight overpressure of nitrogen. The lowest temperature at which the non-reactive monomer mixture remained clear and transparent with no precipitation and at which it could still be stirred by the magnetic stir bar was then recorded as the LST for that composition.

The LDT and LST values for various non-reactive monomer mixtures are reported below. The content of each monomer is given as a mole % relative to the molar carbonate (BMSC) content.

Additionally it was of interest in these tests to determine whether or not conversion of the monomers was required or helpful for a particular composition to dissolve and form a non-reactive monomer mixture. Conversion of monomers could occur due to the presence of catalytic metal impurities in the monomers or by intentional addition of catalyst. Conversion can be useful in that it may reduce the (LDT) and thus minimize exposure of the monomers to high temperatures. Conversion can be induced by simply adding an organic and/or inorganic transesterification catalyst such as a base. In the example more conversion was intentionally induced through the addition of 50 µEq of tetramethylamnmonium hydroxide (TMAH) relative to the total diol and/or diacid molar content of the non-reactive monomer mixture formulation. Conversion can be undesirable though in that the presence of catalytic species may cause the formation of byproducts such as internal ester linkages or chainstopping end groups such as alkyl carbonates and/or alkyl ethers. In addition, conversion may cause an increase in molecular weight and thus increase in the LST. The glassware used in these tests was treated for at least 24 hours in a 0.1 HCL acid bath and then rinsed with MilliQ deionized water until the rinse water was pH neutral.

Another aspect to be evaluated in these studies was whether devolatization of monomers from the non-reactive monomer mixture occurred to form insoluble crystals on the exposed surfaces of the vessel containing the non-reactive monomer mixture. The resulting changes in the non-reactive monomer mixture composition may cause uncontrolled changes in the stoichiometric ratio and thus molecular weight of the polymer obtained from the non-reactive monomer mixture. Therefore the flasks were visually inspected for the formation of crystalline deposits during the run.

During the entire process of determining the LDT and LST values for a particular composition, it was noted whether any loss of monomers by devolatization and subsequent formation of solid crystalline deposits had occurred.

In order to determine whether conversion was required to prepare a particular non-reactive monomer mixture composition or occurred due to catalytic impurities, a sample of the formed non-reactive monomer mixture was taken and analyzed by HPLC for the presence of methyl salicylate (MS), the phenolic byproduct of the transesterification reaction of BMSC. The level of MS found gives a measure of the level of conversion in the non-reactive monomer mixture, and the absence of MS indicated that no conversion had occurred in the non-reactive monomer mixture.

In the present Example a mixture comprising 3 monomer compounds was prepared. The first compound was BPA having a melting point of 159° C. and it was present in an amount of 63.3 (mol %) compared to the rest of the monomers. The second monomer compound was PPP-BP having a melting point between 293 and 296° C. and it was present in an amount of 34.1 (mol %) compared to the rest of the monomers. The third monomer compound was Pluronics (PE3500) having a melting/solidification temperature 7-12° C. and it was present in an amount of 2.6 (mol %) compared to the rest of the monomers. The measured LDT was 195° C. The measured LST was 95° C. and no crystallization was observed when no processing additive was present. The measured LST was 145° C. and no crystallization was observed when a TMAH processing additive was present.

This Example demonstrates that monomer mixtures may further comprise a monomer having a melting point below that of the diaryl carbonate in addition to a monomer mixture having a melting point above the diaryl carbonate. This Example demonstrates that a monomer (i.e. Pluronics PE3500) having a melting/solidification temperature of 7-12° C. (i.e. well below that of BMSC), can also be incorporated into the non-reactive monomer mixtures. These "lower melting" monomers may be added to the non-reactive monomer mixture at any point. However, it is preferred that these "lower melting" monomers be introduced to non-reactive monomer mixtures after the mixtures have been cooled or during cooling to minimize any temperature degradation of these monomers.

The invention claimed is:

1. A method of forming a non-reactive monomer mixture suitable for use in a melt transesterification reaction to form polycarbonate, the method comprising the steps of:
 (i) providing a diaryl carbonate;
 (ii) selecting a first monomer compound having a melting point that is greater than the melting point of the diaryl carbonate,
 (iii) performing a monomer conditioning step selected from the group consisting of:
  (a) testing the first monomer compound for the presence of alkali metal prior to forming the non-reactive monomer mixture, and if said alkali metal is present, performing a step selected from the group consisting of:
   (I) treating the first monomer compound to reduce the level of said alkali metal to an amount of less than 600 ppb,
   (II) adding an acid stabilizer to the first monomer compound, and
   (III) a combination of steps (I) and (II), and
  (b) treating the first monomer compound with a step selected from the group of:
   (I) treating the first monomer compound to reduce the level of said alkali metal to an amount of less than 600 ppb,
   (II) adding an acid stabilizer to the first monomer compound, and
   (III) a combination of steps (I) and (II),
 (iv) adjusting the temperature of the diaryl carbonate to a first temperature that is:
  greater than the melting point of the diaryl carbonate; and
  below the melting point of the first monomer compound;
 (v) adding the first monomer compound as a solid to the diaryl carbonate,
 wherein the first temperature is selected such that the first monomer compound added to the diaryl carbonate disperses in the diaryl carbonate to produce a first monomer mixture, and
 (vi) selecting a second monomer compound, wherein the first monomer compound requires a higher temperature to disperse in the diaryl carbonate than the second monomer compound, lowering the temperature of the first monomer mixture to a second temperature sufficiently high to maintain the first monomer compound in solution and to permit dispersion of the second monomer compound, said second temperature being above the melting point of the second monomer compound, and adding the second monomer compound to the non-reactive monomer mixture at the second temperature, wherein the second temperature is selected such that the second monomer compound added to the non-reactive monomer mixture disperses in the non-reactive monomer mixture.

2. The method of claim 1, further comprising the step of performing a monomer conditioning step on the second monomer compound selected from the group consisting of:
 (a) testing the second monomer compound for the presence of alkali metal prior to forming the non-reactive monomer mixture, and if said alkali metal is present, performing a step selected from the group consisting of:
  (I) treating the second monomer compound to reduce the level of said alkali metal to an amount of less than 600 ppb,
  (II) adding an acid stabilizer to the second monomer compound, and
  (III) a combination of steps (I) and (II), and
 (b) treating the second monomer compound with a step selected from the group of:
  (I) treating the second monomer compound to reduce the level of said alkali metal to an amount of less than 600 ppb,
  (II) adding an acid stabilizer to the second monomer compound, and
  (III) a combination of steps (I) and (II).

3. The method of claim 1, wherein the second monomer compound is at a temperature in a range between 20° C. and 30° C. when it is added to the diaryl carbonate.

4. The method of claim 1, wherein the second monomer compound is added as a liquid to the diaryl carbonate.

5. The method of claim 1, wherein the diaryl carbonate comprises BMSC or DPC, and wherein the method further comprises the step of adding a phenolic compound to the diaryl carbonate either before adding the first and second monomer compounds or together with the first monomer compound, the second monomer compound, or both the first and second monomer compounds,
 wherein if the diaryl carbonate comprises BMSC the phenolic compound comprises methyl salicylate, and wherein if the diaryl carbonate comprises DPC the phenolic compound comprises phenol.

6. The method of claim 1, wherein the second monomer compound comprises a compound selected from the group consisting of: isosorbide, ethylene glycol, 1,3-Propanediol, 1,2-Propanediol, 1,4-Butanediol, 1,3-Butanediol, 1,5-Pentanediol, 1,6-Hexanediol, 1,7-Heptanediol, 1,10-Decanediol, 1,2-Cyclohexanediol, trans-1,2-Cyclohexanediol, cis-1,2-Cyclohexanediol, 1,4-Cyclohexanedimethanol, $C_{36}$ branched fatty diol, and 1,2,6-Hexanetriol.

7. The method of claim 1, further comprising the steps of lowering the temperature of the non-reactive monomer mixture, and storing the non-reactive monomer mixture for a period of between 1 and 6 hours.

8. The method of claim 1, wherein the total moles of the first plus the second monomer compounds and the diaryl carbonate are present in a mole ratio of moles monomer to moles of diaryl carbonate from 0.9 to 1.1.

9. The method of claim 1, wherein the acid stabilizer comprises a phosphorus containing acid.

10. The method of claim 1, wherein the method is accomplished by performing the steps in the order of (i), (ii), (iii), (iv), (v), and then (vi) or in the order of (i), (ii), (iii), (v), (iv), and then (vi).

* * * * *